Patented June 5, 1934

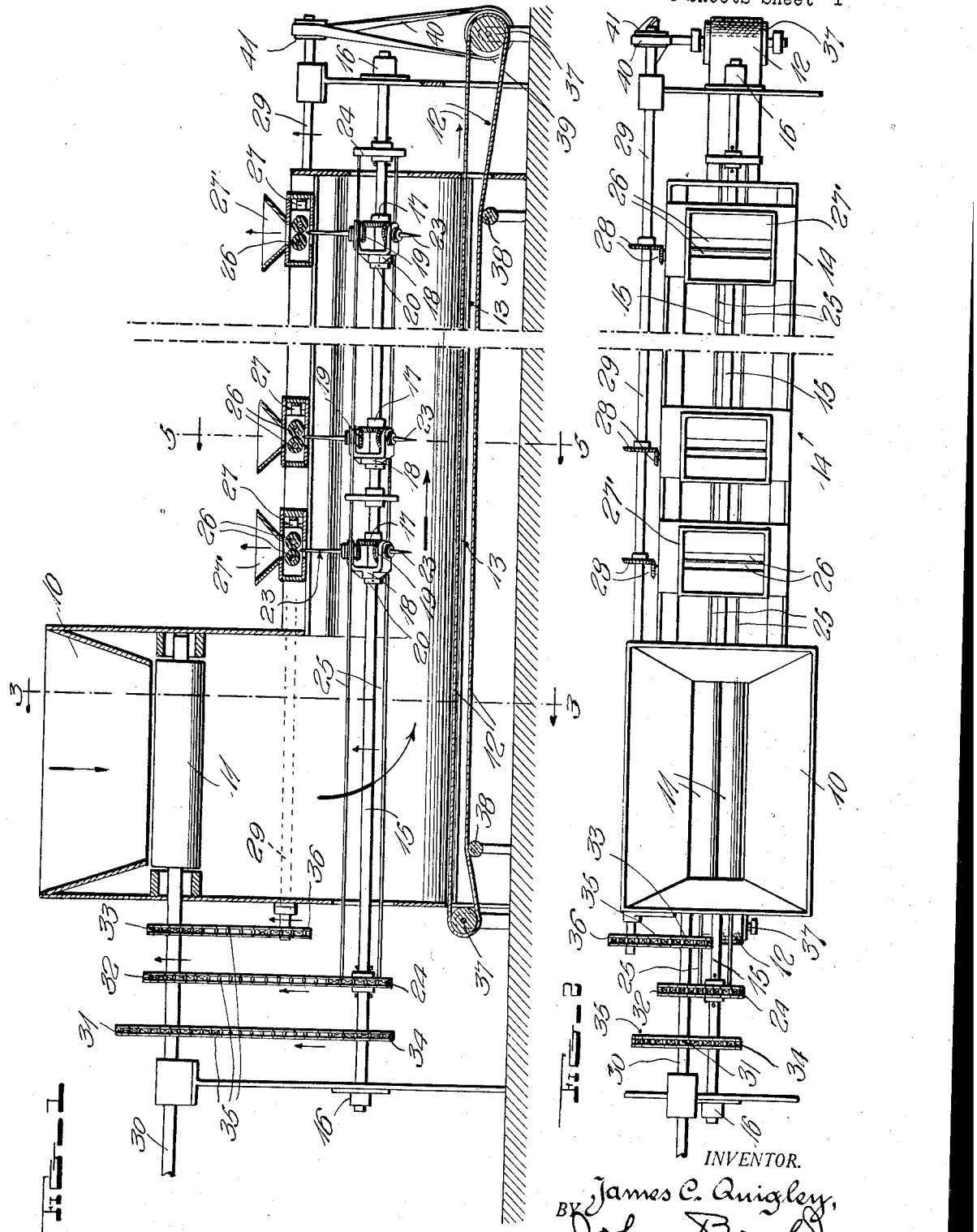

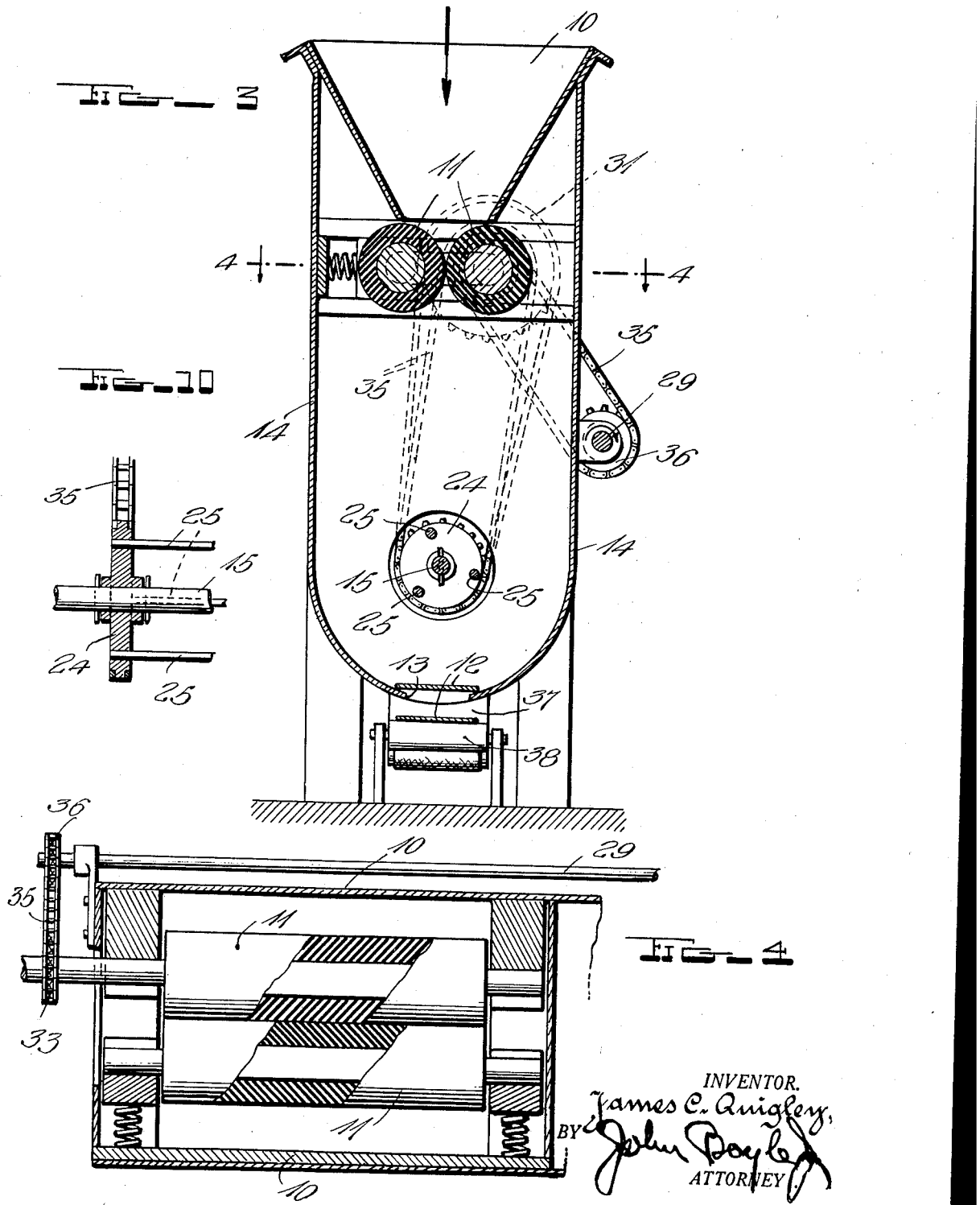

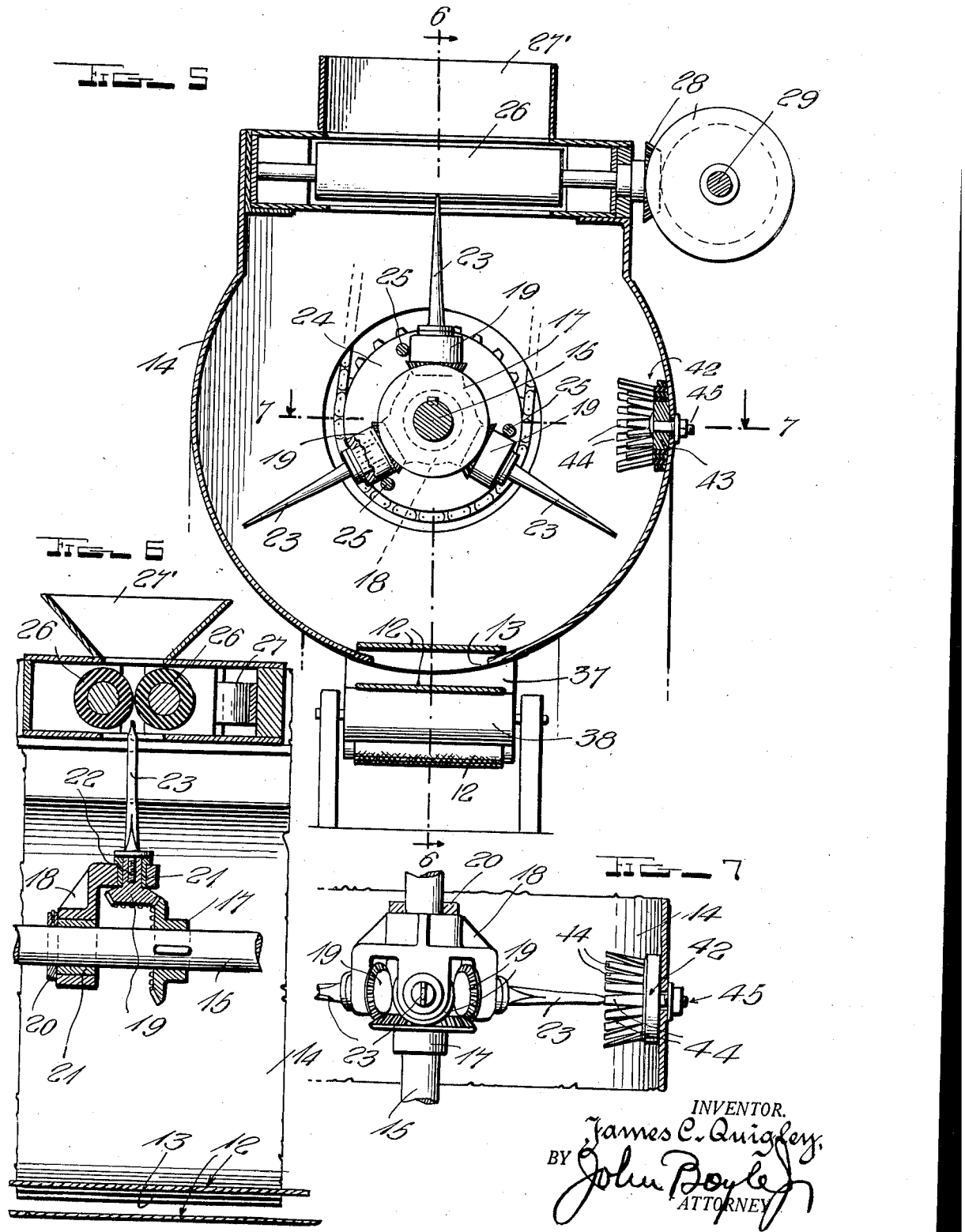

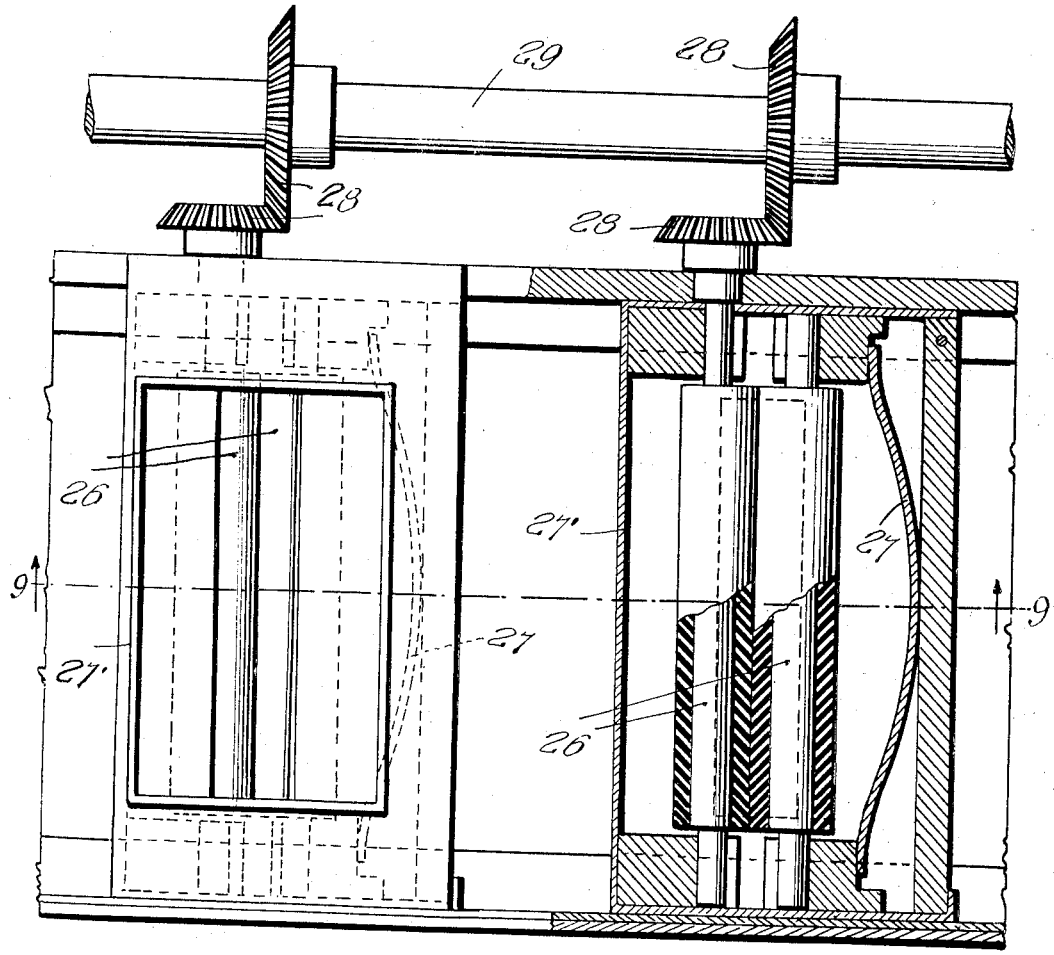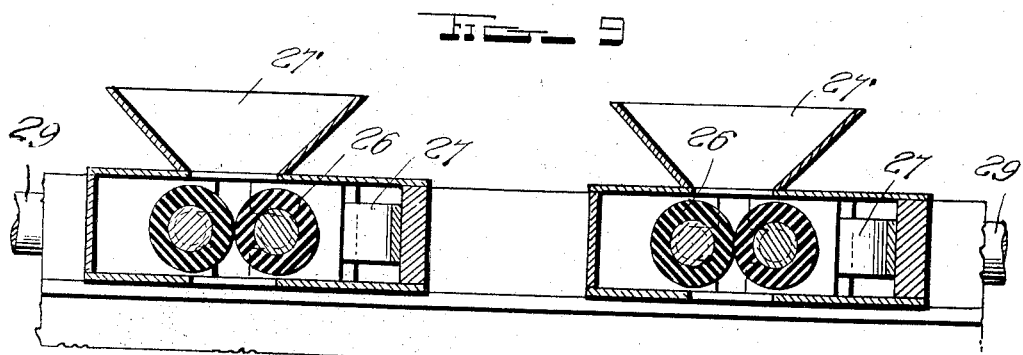

1,961,431

UNITED STATES PATENT OFFICE 1,961,431

COTTON SEPARATING MACHINE

James C. Quigley, Homer City, Pa.

Application December 15, 1931, Serial No. 581,234

5 Claims. (Cl. 19—38)

My invention relates to a method and apparatus for separating cotton that is gathered in the operation of sledding or stripping cotton in opened and unopened bolls from the cotton plant.

In the accompanying drawings:

Fig. 1 is a central, vertical, longitudinal, sectional view of a cotton separating machine constructed in accordance with my invention, Fig. 2 is a top plan view thereof, Fig. 3 is a transverse, vertical, sectional view on an enlarged scale taken on line 3—3 of Fig. 1, Fig. 4 is a horizontal, sectional view taken on line 4—4 of Fig. 3, Fig. 5 is a transverse, vertical, sectional view taken on line 5—5 of Fig. 1, Fig. 6 is a detail longitudinal, sectional view taken on line 6—6 of Fig. 5, Fig. 7 is a fragmentary, horizontal, sectional view taken on line 7—7 of Fig. 5.

Fig. 8 is a fragmentary top plan view partially in horizontal section,

Fig. 9 is a vertical, sectional view taken on line 9—9 of Fig. 8, and

Fig. 10 is a detail vertical, sectional view of one of a pair of loosely mounted idler sprockets carrying the longitudinally extending agitating bars.

The opened and unopened bolls and residue removed from the cotton plants are fed into a hopper 10 and then passed between crushing rolls 11, which may be corrugated or of any other suitable type made of rubber or suitable composition so as not to break the cotton seed in the lint. These rolls break up the burrs and crush open the unopened bolls. The mixed mass coming through the rolls falls onto a conveyor belt 12, on the inside of the bottom of the circular shaped receptacle 14.

Within the receptacle is mounted the rotary shaft 15 supported on bearings 16 at each end. Keyed to this shaft are a series of bevelled gears 17. Adjacent to each bevelled gear is an idler yoke 18 that may carry three or more bevelled pinions 19 which mesh with the bevelled gear 17. The idler yoke 18, in which the pinions 19 are mounted to rotate, is rotatably mounted on the shaft 15, the collar 20 holding it against longitudinal movement in one direction and the keyed bevel gear in the other direction. Bearings 21 are mounted in the yoke to reduce friction between the rotary parts. Connected to the neck of the pinion 19 by a threaded joint 22 are flat pointed steel members 23.

Rotatably mounted on the shaft 15 are idler sprockets 24 connected by bars 25 that engage the yokes 18.

Above each set of yokes are mounted rolls 26 that are made of rubber or suitable composition and held in yielding engagement by the leaf spring 27. As will be noted, the end of the flat pointed members 23 is just below the bite of the rolls 26. A hopper 27' is located above the rolls 26. The rolls 26 are positively rotated through the medium of bevel gears 28 connected to a power shaft 29.

The power shaft 30 which directly rotates the crushing rolls 11 carries sprockets 31, 32 and 33 keyed directly to the same, and sprocket chains 35 transmit power to the sprocket wheels 24, 34 and 36 respectively. The sprocket wheel 34 is keyed to the shaft 15 and rotates with it, while the idler sprocket 24 rotates relative to the shaft 15. The smaller size of the sprocket 32 relative to the sprocket 31 causes the sprocket 24 to rotate slower than the sprocket 34. The rotation of the idler sprocket 24 through the medium of the rods 25 causes rotation of the yokes 18 and hence rotation of the bevel gear 19 and flat pointed member 23. The flat pointed member 23 accordingly rotates about the shaft and at the same time about its own longitudinal axis.

The sprocket wheel 36 is keyed to the shaft 29 and accordingly, rotates it.

The belt conveyor 13 passes through the body on the curved bottom and around rolls 37 at each end and over supporting rolls 38. Power for moving the belt conveyor is from the shaft 29 to pulley 41, belt 40 and pulley 39.

Extending inwardly from the receptacle 14 and adjacent the pointed members 23 is a rubber brush 42 that has a body portion 43 pivoted at 45 and covered with rubber and flexible rubber fingers 44 around its circumference.

In operation, the cotton that is full of burrs, some of it unopened and containing sand and other foreign matters, is dumped into the hopper 10 and is crushed as it passes through the rolls 11, and falls onto the conveyor 12. As the cotton passes along under the flat pointed members 23 it is picked up by them and then rotated about the longitudinal axis of the member 23. The picked up cotton also rotates and is beaten against the rubber brush as it passes through the flexible fingers 44 and out again at the top in its circular travel. The rubber brush having slits cut around its edge removes burrs and residue, by the friction of the rubber against the rotating cotton. As it passes upwardly from the bottom of the receptacle, the cotton then passes up underneath the rolls 26 which draws it off of the members 23 which then continue to rotate to repeat the operation.

The distance between the rotating flat pointed members and the belt conveyor decreases from the charging to the discharging end. At the charging end the distance will be about ¾ of an inch and at the discharging end about ¼ of an inch. By this construction the larger bolls will be separated first and the smaller bolls will be picked up near the discharge end thereby grading the cotton.

Any cotton that misses contact with or flies off of the flat pointed member falls back down the sides of the circular receptacle in place for the next contact.

I claim:

1. A machine for separating cotton comprising a conveyor for the cotton, residue and burrs, a rotary shaft, a bevel gear keyed on the shaft, a yoke carried by and rotating relative to the shaft, a pinion rotatably carried by the yoke and engaging the gear, and a rotary flat pointed member for engaging the cotton and carried by the pinion.

2. A machine for separating cotton comprising a conveyor for the cotton, residue and burrs, a rotary shaft, a gear keyed on the shaft, a yoke carried by and rotating relative to the shaft, a pinion rotatably carried by the yoke and engaging the gear, and a rotary flat pointed member for engaging the cotton and carried by the pinion, and a member adjacent the rotary member and against which the cotton is beaten.

3. A machine for separating cotton comprising a rotary shaft, a member rotating with the shaft and provided with means for picking up separate portions of cotton, means for individually whirling each separate portion and a second member adjacent the first member and against which the cotton is beaten while whirling, and resilient rolls for removing the cotton, after it is beaten, from the second member, the cotton being removed from the ends of the spindles by the bite of the rolls.

4. A machine for separating cotton comprising a rotary shaft, a gear keyed on the shaft, a yoke carried by and rotating relative to the shaft, a spindle rotatingly mounted in the yoke and provided with a gear engaging the said first gear.

5. A machine for separating cotton comprising a rotary shaft, a yoke carried by and rotating relative to the shaft, a spindle in the yoke and mounted to rotate about its longitudinal axis and means carried by the shaft for so rotating the spindle.

JAMES C. QUIGLEY.